June 4, 1957 J. J. YOSTPILLE 2,794,970

IDENTIFICATION OF SERIAL STORED INFORMATION

Filed July 5, 1955 4 Sheets-Sheet 1

INVENTOR
J. J. YOSTPILLE
BY
William F. Simpson
ATTORNEY

IDENTIFICATION OF SERIAL STORED INFORMATION

Filed July 5, 1955 4 Sheets-Sheet 2

INVENTOR
J. J. YOSTPILLE
BY William F. Linfson
ATTORNEY

IDENTIFICATION OF SERIAL STORED INFORMATION

Filed July 5, 1955 4 Sheets-Sheet 3

INVENTOR
J. J. YOSTPILLE
BY William F. Simpson.
ATTORNEY

June 4, 1957 J. J. YOSTPILLE 2,794,970

IDENTIFICATION OF SERIAL STORED INFORMATION

Filed July 5, 1955 4 Sheets-Sheet 4

INVENTOR
J. J. YOSTPILLE
BY
William F. Simpson.
ATTORNEY

United States Patent Office 2,794,970

Patented June 4, 1957

2,794,970

IDENTIFICATION OF SERIAL STORED INFORMATION

John J. Yostpille, Livingston, N. J., assignor to Bell Telephone Laboratories, Incorporated, New York, N. Y., a corporation of New York Application July 5, 1955, Serial No. 519,771

10 Claims. (Cl. 340—174)

This invention relates to improved methods, circuits and apparatus for uniquely identifying each of a plurality of storage items and more particularly to improvements in the arrangement disclosed in the copending application of A. E. Joel, Jr. and J. J. Yostpille entitled Identification of Stored Information, Serial No. 493,721, filed March 11, 1955.

In accordance with this invention improved methods, circuits and apparatus for identifying each of a plurality of items stored in serial delay lines or storage systems are provided in which each item is uniquely identified by means of a single binary digit or bit individually associated with each of the stored items to be identified. The items to be identified are arranged in a predetermined order in the serial storage system and the identity of each of the items uniquely determined by examining a plurality of the binary digits or bits associated with individual ones of predetermined ones of said items when said items are arranged in said predetermined order.

In identifying items in serial storage systems in the prior art, it is necessary to uniquely identify some signal stored in the serial storage system as the starting signal and then count all of the succeeding signals or each group of succeeding signals to locate predetermined desired signals or groups of signals representing storage items. In case of error in counting the signals or groups of signals all of the remaining signals in a cycle will be improperly identified. In another arrangement in the prior art, it is necessary to include or add to each group of signals stored in a serial storage system a plurality of digits or bits sufficient to uniquely identify each of the stored items. In case of relatively large storage systems, the number of address or identifying digits or bits approached or even exceeded the number of bits comprising or stored in each group or information item thus necessitating a storage system having much greater capacity or materially reducing the capacity of a given storage system.

An object of the present invention is to provide an arrangement for uniquely identifying or addressing each group of signals commonly called a "word" in a serial storage system by merely adding a single binary bit to each of the groups or words stored in the system. By examining said identifying digit of a predetermined plurality of said "words" successively, each of the words or groups of signals representing an information item may be uniquely identified. In the arrangement in accordance with this invention, should an error occur, proper synchronism between the succeeding signals and the control circuits is automatically reestablished after said predetermined number of added digits are examined.

The present invention is not limited to the binary number system and may be employed with other number systems having any desired radix or base. However, the specific embodiment disclosed herein employs the binary number system since it permits the invention to be readily described, explained, and understood.

It has been discovered that a plurality of numbers of a predetermined number of digits $n$ may be arranged in predetermined sequences such that any one digit as, for example, the last digit of predetermined ones of $n$ of the numbers in said sequence are the same as the digits of the number in question. Consequently, it is only necessary to examine in some manner or determine the identity of said one digit of said $n$ numbers. In other words, it is only necessary to add said one digit to each of the information items stored and then examine or determine the identity of said predetermined digit of predetermined ones of said numbers in said sequence. In the exemplary embodiment of this invention described herein, such sequences of binary numbers are described. One digit as, for example, the last digit of such numbers is associated with or appended to each of the words or information items to be identified.

A further object of this invention is to supply such binary bits to a shift register and the setting of the shift register at any instant of time after $n$ digits or bits have been entered therein uniquely identifies one of the words or information items in said sequence. Thus when the circuits fail to properly respond to a pulse, or when a spurious pulse is received proper synchronism is established $n$ words, information items, or identifying pulses later.

An elementary series of such numbers is illustrated by the following two-digit binary numbers:

| | |
|---|---|
| 0 | 1 |
| 1 | 1 |
| 1 | 0 |
| 0 | 0 |

If the above series of numbers are written on a loop of tape then considering for example, the second line of two ones, it is noted that the last digits of the first two numbers are likewise two ones. Considering the third line, if one reads the numbers from left to right, one reads a one and a zero. Likewise, the last digits of the second and third numbers reading down are one and zero. Thus the identity of each of the lines may be obtained equally well from reading the numbers in that line or by reading the last digit of the number immediately preceding the number and the last digit of the number. Thus if the last digits of the numbers are inserted in a two-stage shift register, the setting of the shift register at all times will uniquely identify each of the lines and only one digit of the numbers is required to be entered in the lines and supplied to the shift register. Each of the lines of the table may represent an item of information and such items are each uniquely identified by adding the last digit only of the numbers in the table to the respective lines and then examining two successive ones of said added digits.

Numerous sequences of numbers having the characteristics described above may be devised and arranged and the last digit, or some other predetermined digit of the number, appended to storage items to uniquely identify each of the storage items in the manner described above.

As set forth in the above-identified copending application, numerous sequences of such numbers may be employed to identify storage items and the storage items may be arranged in groups of any desired numbers of these items from $n$ to $2^n$ and then each item of the group uniquely identified.

Another object of this invention is to provide circuit means for first entering said identifying digits in each of the storage slots or divisions of the storage space in a serial storage system.

Another object of this invention is to employ such additional identifying digits for controlling the entering of the storage information in the proper storage slots or divisions of the serial delay system.

Another object of this invention is to provide circuits, means, apparatus and methods of reading out stored information under control of predetermined plurality of said additional identifying digits.

A feature of this invention relates to a tapped delay line storage system for substantially simultaneously determining the character of a predetermined group of digits in said delay system.

Another feature of this invention relates to a delay system comprising a main delay section and a plurality of short delay sections arranged in a delay loop to permit a plurality of the identifying digits to be substantially simultaneously observed and the further control of the system actuated in response to said plurality of said identifying digits.

Another feature of the invention relates to the use of a shift register in combination with a delay line for responding to the identifying digits for the further control of the entering and reading out of information from the delay storage system.

Another feature of the invention relates to an arrangement of a delay system including a shift register serially connected in the delay loop for substantially simultaneously determining the identity of a plurality of identifying digits.

The foregoing and other objects and features of this invention may be more readily understood from the following description when read with reference to the attached drawing in which.

Figure 6:
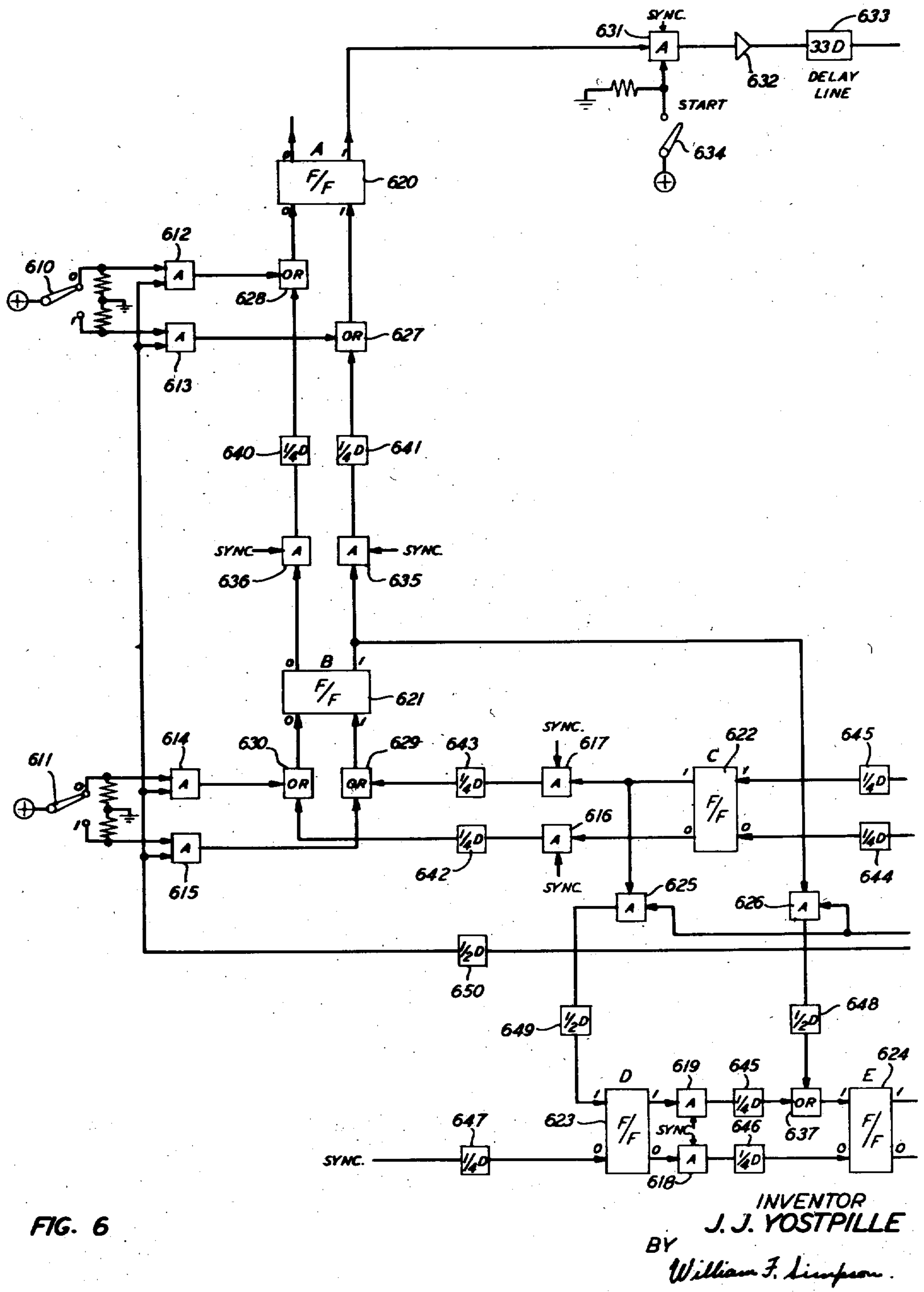
Figure 7:
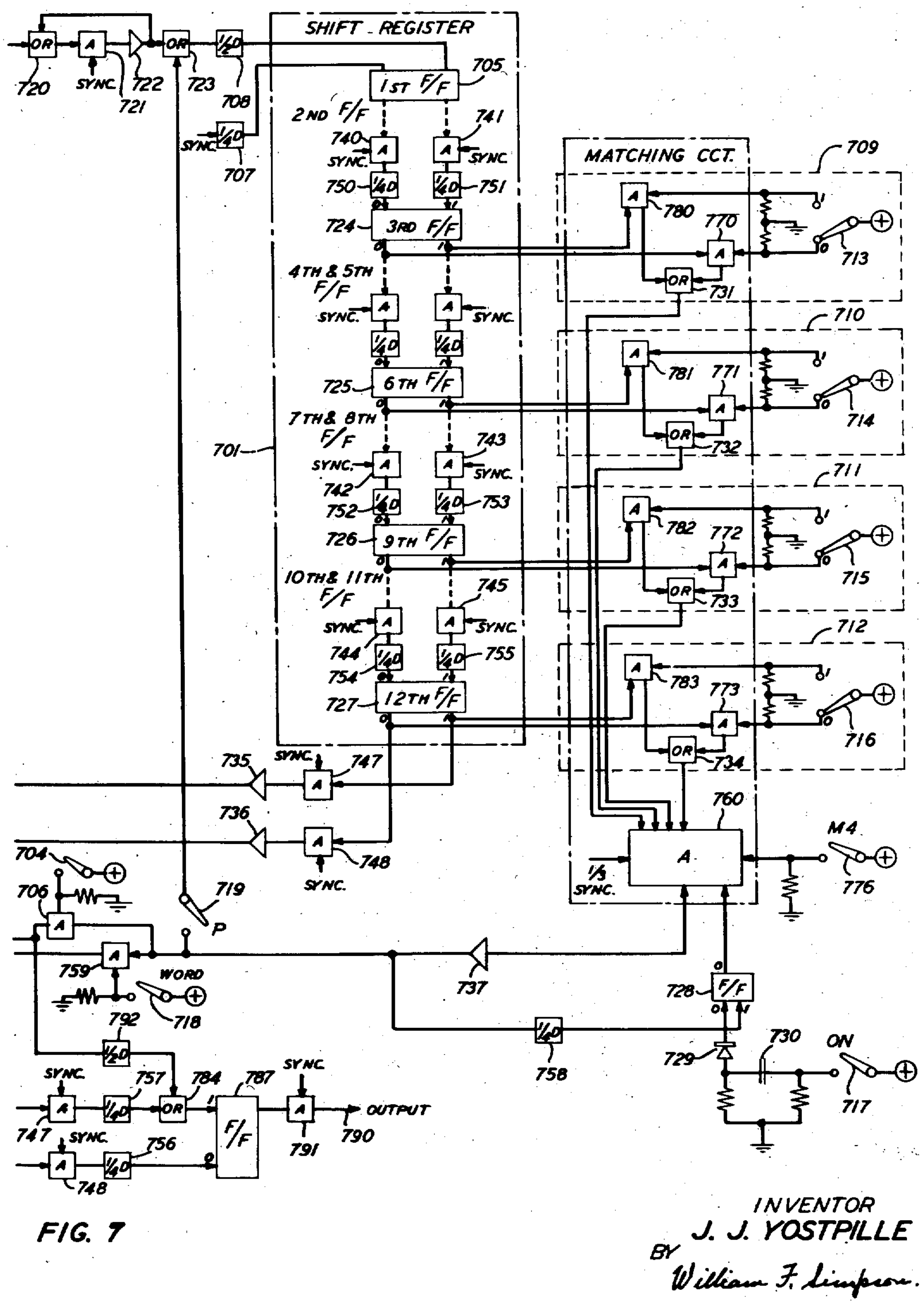

Figs. 6 and 7, when arranged with Fig. 6 to the left of Fig. 7, show an embodiment of this invention employing a shift register as part of a storage or delay loop of a storage system which shift register is also employed to substantially simultaneously determine the character of a plurality of identifying digits for controlling the entering and reading out of information in the serial storage system.

In the exemplary embodiment of this invention described herein in detail, the circuits are arranged to uniquely identify 16 different storage items or words so that $n$ is equal to 4. The rules for devising or arranging numbers in series having the above-described properties apply to numbers of any number of digits or denominational orders. Consequently, these rules will be illustrated for $n$ equal to the small integer of 4, it being understood that the same rules apply for other integral values of $n$. For purpose of illustration, one method of obtaining a suitable series of numbers will now be described with reference to Table A which follows:

TABLE A

| 1 | 2 | 3 | 4 | 5 |
|---|---|---|---|---|
| 0000 | 0 | 1 | 1 | 0001 |
| 0001 | 1 | 3 | 3 | 0011 |
| 0010 | 2 | 5 | 7 | 0111 |
| 0011 | 3 | 7 | 15 | 1111 |
| 0100 | 4 | 9 | 14 | 1110 |
| 0101 | 5 | 11 | 13 | 1101 |
| 0110 | 6 | 13 | 11 | 1011 |
| 0111 | 7 | 15 | 6 | 0110 |
| 1000 | 8 | 1 | 12 | 1100 |
| 1001 | 9 | 3 | 9 | 1001 |
| 1010 | 10 | 5 | 2 | 0010 |
| 1011 | 11 | 7 | 5 | 0101 |
| 1100 | 12 | 9 | 10 | 1010 |
| 1101 | 13 | 11 | 4 | 0100 |
| 1110 | 14 | 13 | 8 | 1000 |
| 1111 | 15 | 15 | 0 | 0000 |

For $n$ equal to 4 it is possible to have 16 different numbers. These numbers are arranged in the numeral binary number arrangement in column 1 of Table A. In column 2 of Table A these numbers are given the corresponding decimal notations or numbers 0 to 15. In column 3 the odd integers of the numbers 0 to 15 are listed twice, one opposite each one of the numbers in columns 1 and 2.

In devising a sequence of numbers having the above-described properties, one starts in the first row of column 2 and then observes the corresponding number on column 3 which is a one. Next a one is written in column 4 and the corresponding binary notation for one written in column 5. Next the line of the table having a one written in column 2 is observed and the corresponding number in this line in column 3 entered as the second number in column 4, this number being a 3. The corresponding binary number or notation for 3 is then entered in column 5. Next the line in Table A having a 3 in column 2 is observed and the corresponding number in column 3 being a 7, a 7 is entered in column 4, line 3, the corresponding binary number entered in column 5, line 3. Next the line of the table having a 7 in column 2 is observed and the corresponding number for this line in column 3 which is 15 is entered in the fourth line of column 4 and the corresponding binary number entered in the column 5. Next the line of the Table A having 15 in column 2 is observed. The corresponding number in column 3 is also 15. However, 15 has already been entered in column 4, line 4 so one is subtracted from 15 and 14 entered in column 4. The corresponding binary number is entered in column 5. Then the line of the table having 14 entered in column 2 is observed and the corresponding number in this line of column 3 is 13. Inasmuch as 13 has not been previously entered in column 4, 13 is now entered in column 4 and the corresponding binary number entered in column 5. The above steps are then repeated until the columns 4 and 5 are completely filled in. Each time the number determined in column 3 has not been previously entered in column 4 this number is entered in column 4 and the corresponding binary number entered in column 5. Each time the number as determined from column 3 has been previously entered in column 4, one is subtracted from this number and the resultant number entered in column 4 and the corresponding binary number entered in column 5. Columns 4 and 5 have been completed in the above fashion. It should be noted that each of the binary numbers of column 1 appears once and only once in column 5, but that the numbers are arranged in a different order than the order shown in column 1.

If it is assumed that these numbers are arranged on an endless tape then each one of the numbers has the same digits as the last digits of the preceding three numbers and the last digit of the number in question. Thus, the first number 0001 may be obtained by observing the last digits of the last three numbers in the table and the last digit of the first number which is 0001. In a similar manner, each of the other numbers in column 5 may be determined from the last column of digits. Consequently, it is necessary to add only the last digits of these numbers to 16 different storage items and then observe the last digits of the proper four storage items to uniquely identify a corresponding storage item. As shown in column 5, the last of the four digits reading down is the same as the corresponding number from which the last digit is obtained. It should be observed, of course, that these numbers may be employed to identify a storage item arranged in the same line or in a plurality of similar other lines.

The four digits may be employed to designate some other storage item, as for example, the storage item in the next line or slot or the storage item in a preceding line or slot or some other storage item displaced a desired number of lines or slots from the last digit observed or related in some other predetermined fashion with the digits observed.

Of course, the series of numbers shown in column 5 is assumed to be the same series independently of where one starts, i. e., independently of which one of the numbers of column 5 appears at the beginning and the end of the column and independently of which one of the numbers is assigned to identify the first storage item or word to be uniquely identified. It is also possible to arrange numbers in a reverse order so that the last digits should be read up instead of read down. It is also possible to invert the numbers from left to right so that the digits in the first column will be the same as the succeeding digits of the various numbers. In addition, the digits of the numbers may be rearranged so that some one of the digits in an intermediate column may define the other digits of the number as may be desired. Of course, in any of the various series of numbers that one might obtain, a different series may be readily obtained by interchanging the ones and the zeros. In addition to the above variations of different arrangements of the numbers, it is possible to obtain different series of numbers having the above-described properties and the larger the number of digits $n$ the greater the number of different series of such numbers may be devised. In addition, each of the different series has all the various alternatives mentioned above.

Figures 1, 1A:
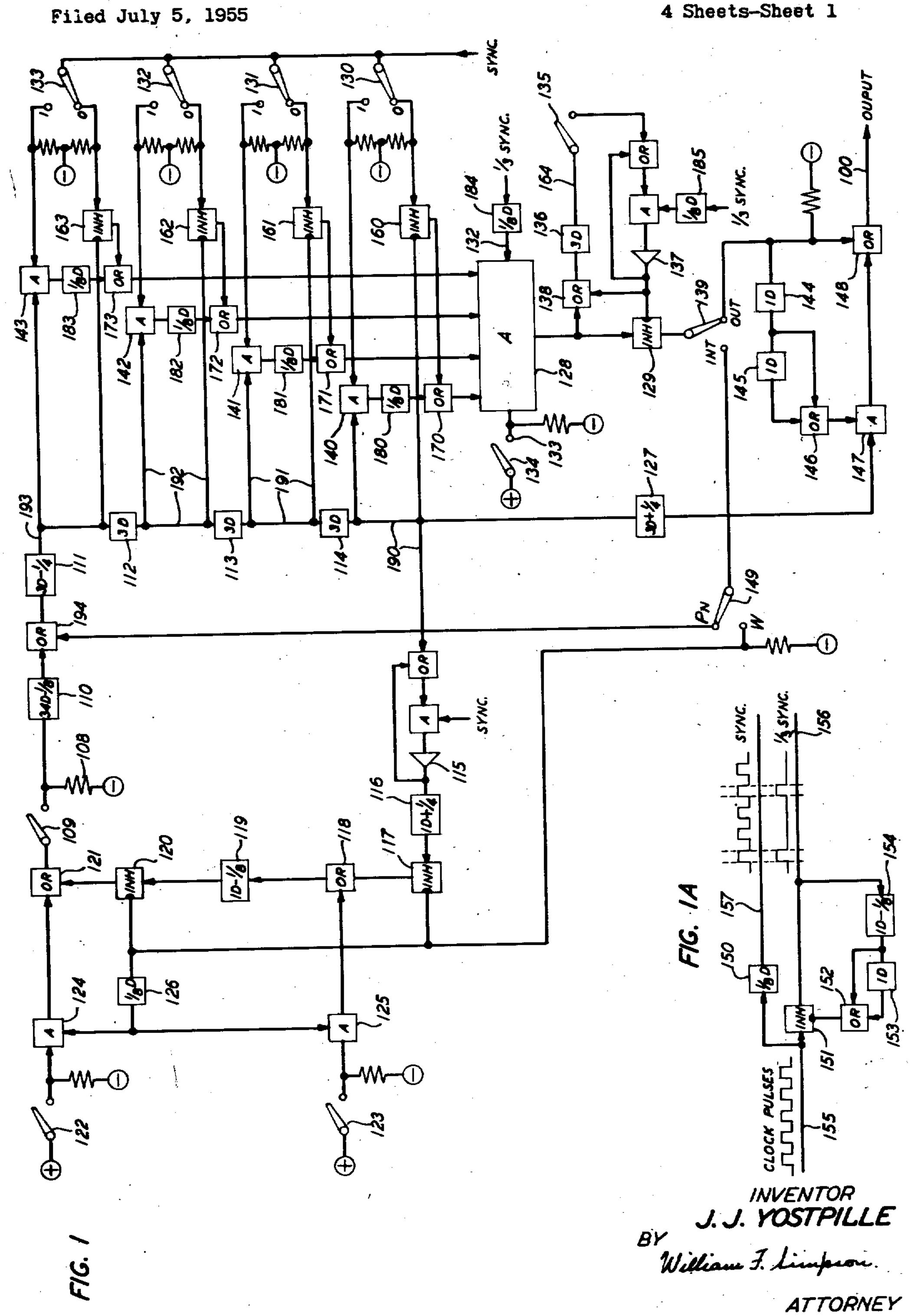
Fig. 1 shows one embodiment of the invention employing a main delay section and a plurality of minor or short delay sections arranged as a tapped delay line for controlling the entering and reading out of information in accordance with this invention.
Fig. 1A shows one embodiment of a synchronizing arrangement for obtaining the desired synchronizing control pulses.

Fig. 1, together with Figs. 1A, 2, 2A, 3, 3A, 4, 4A, and 5, show details of a synchronously operated, serial delay line storage device incorporating identifying methods, circuits and apparatus in accordance with an exemplary embodiment of this invention. Fig. 1 is a schematic of the various circuits and their mode of co-operation and the control for such a storage device. Figs. 1A, 2, 2A, 3, 3A, 4, 4A and 5 show circuit details of the various component circuits of Fig. 1 which are represented in Fig. 1 in outline form.

In the exemplary embodiment shown in Fig. 1, the delay line has been arranged to store 16 two digit binary numbers or words. A single identifying binary digit has been added to each word. Thus, the stored words plus the single identifying digits comprise 48 binary digits. Thus the total delay line loop comprises storage space for 48 binary digits. In other words, the delay time around the complete storage loop is forty-eight pulse intervals long. As shown in Fig. 1, the complete recirculating storage loop comprises a delay device 110 which is shown to be thirty-four units minus an eighth of a unit long, i. e., thirty-three and seven-eighths pulse intervals. Delay device 111 has a delay time of three intervals minus one-quarter of a pulse, delay devices 112, 113 and 114 each of which have delay intervals of three pulse intervals, a retiming amplifier 115, delay device 116 having a delay interval of one and one-quarter pulse intervals, inhibitor circuit 117 has a delay interval of one-eighth of a pulse interval, the "Or" gate circuit 118 having substantially no delay interval, a delay device 119 having seven-eighths of a pulse interval delay period, inhibitor time 120 having delay interval of one-eighth of a pulse interval and the "Or" gate device 121 having substantially no delay interval for a total of forty-eight pulse intervals of delay around the above-described loop.

The various delay devices may comprise a mercury tank delay device, quartz crystal delay devices as well as other sonic or ultrasonic delay devices including suitable sonic transmission mediums as well as electrical transmission lines and delay networks, having either distributed constants or lumped elements having the desired delay times and characters. Each of these devices also includes appropriate input and output coupling circuits and apparatus as well as amplifiers and other related equipment usually employed in combination with the respective types of delay devices and systems. The various delay devices need not all be of one type but certain of them may be of one type and others of another type. In addition, each of the devices may include more than one type of delay device or transmission medium as may be desired. Inasmuch as such delay devices are known in the art and operate in their usual manner in combination with the various elements of the exemplary embodiment set forth herein they need not be described further herein. Further details of these devices may be obtained from numerous prior patents and publications.

Figure 2A:
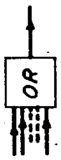
Fig. 2 shows an "Or" gate and Fig. 2A shows a symbolic representation thereof.
Figure 2:
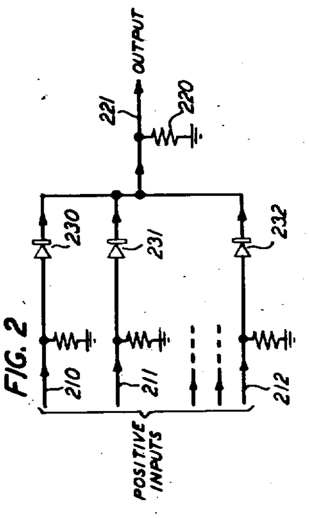

The "Or" gate circuits such as 118 and 121 as well as the other "Or" circuits shown in the drawing including 138, 146 and 152, are shown in detail in Fig. 2. The corresponding representation of this circuit as shown in Fig. 1 is shown in Fig. 2A. In the exemplary embodiment of the invention shown in Figs. 1, 1A, 2, 2A, 3, 3A, 4, 4A, and 5 it is assumed that the two binary conditions employed are zero or ground potential condition and a positive pulse or voltage condition. Thus, the output of the various gate circuits shown in Figs. 2, 3, and 4 and represented in Figs. 2A, 3A, and 4A and also represented in Fig. 1 is zero or ground potential under the normal or inactive condition and a positive pulse or positive voltage representing a binary one or the active condition. Of course, the two signaling conditions may comprise other potential conditions or pulses as is well understood. The active condition may be either positive or negative pulse and the inactive condition ground or the inactive condition may be either positive or negative pulses and the active condition ground. Likewise the active condition may either be positive or negative voltage pulse and the inactive condition the opposite negative or positive voltage condition or impulse. When an active pulse is introduced or extracted from the system this pulse is assumed to be an active pulse all the time it is within the system irrespective of the particular potential or voltage condition representing the pulse at any particular place or position in the system or equipment. As indicated above, substantially all the interconnecting places between the various elements, the active condition is positive pulse or voltage and the inactive condition is zero or ground potential.

Thus in Fig. 2 the output lead 221 is normally at ground potential due to ground being normally applied to the various input leads 210, 211, 212, etc., and due to the ground from resistor 220 applied to the output lead 221. Whenever a positive voltage is applied to any one of the input leads 210, 211, or 212 this voltage causes a current to flow through a corresponding crystal or diode 230, 231 or 232 to ground through resistor 220. As a result a positive voltage drop appears across resistor 220 and is applied to the output conductor 221. Inasmuch as the forward impedance of the diodes 230, 231 and 232 is usually low with respect to the value of resistor 220, substantially the entire voltage of any input applied to the input conductors appears across resistor 220 and is applied to the output conductor 221. Thus the "Or" circuits, such as shown in Fig. 2 and represented symbolically in Fig. 2A, are arranged so that they repeat a positive output on an output conductor when a positive voltage or pulse is applied to any one of the input conductors.

Figure 3A:
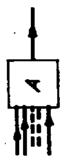
Fig. 3 shows the circuits of an "And" gate and Fig. 3A shows a symbolic representation thereof.
Figure 3:
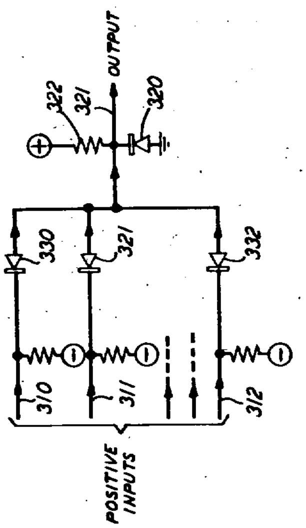

A second kind of a gate circuit represented symbolically in Fig. 3A and shown in more detail in Fig. 3 is also employed. This gate circuit is usually called an "And" circuit and normally has zero voltage or ground potential applied to its output conductor 321. The input conductors 310, 311, 312, etc., normally have substantially ground potential applied to them. If any negative voltage is applied to the output conductor 321 from any source, it will cause a diode 320 to become conducting and maintain the voltage of conductor 321 at substantial ground potential. With positive voltage applied through resistor 322 to the output conductor 321 and through all the diodes 330 through 332, the impedance of the diode 320 is usually maintained at a high value. So long as the input conductors 310, 311, 312, etc., are maintained at a negative voltage or at near ground potential the impedance of each of corresponding diodes 330 through 332 is maintained at a low value thus maintaining the voltage of the output conductor 321 at or near ground potential. This voltage or ground potential is maintained on conductor 321 so long as a positive voltage is not applied to each and all of the input conductors 310 through 312. When, and only when, positive voltage pulse is applied to all of the input conductors a corresponding positive voltage is also applied to the output conductor 321.

Figure 4A:
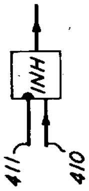
Fig. 4 shows an "Inhibiting" gate and Fig. 4A shows a symbolic representation thereof.
Figure 4:
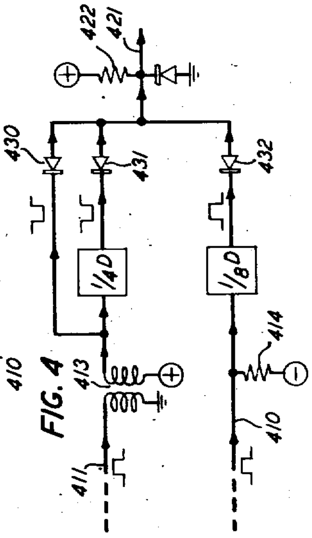

Fig. 4 shows an inhibiting circuit which is represented symbolically in Fig. 4A. This circuit comprises a normal input lead or conductor 410 and an inhibiting input conductor or lead 411. When positive pulses are applied to a normal conductor 410 positive pulses are obtained on the output conductor 421 unless a positive pulse is also applied to the input inhibiting conductor 411. In this case the output conductor 421 is maintained at substantially ground potential. Normally the diodes 430 and 431 are maintained nonconducting due to the positive voltage applied to the secondary winding of the input pulse coil 413. The diode 432 is normally maintained conducting due to the substantially ground potential or negative voltage normally applied to resistor 414 and the positive voltage applied to the output conductor through the resistor 422. When a positive pulse is applied to the input conductor 410 and in the absence of such a pulse applied to input conductor 411 the conduction of diode 432 is decreased or cut off so that the potential of the output conductor 421 is permitted to rise to a positive output voltage which is supplied from the positive voltage connected to secondary winding of the transformer 413 or the positive potential applied to the upper terminal of resistor 422. Consequently, under these circumstances, the inhibiting gate circuit will pass the positive pulse applied to its input lead to its output conductor. However, if there is also a simultaneously applied positive pulse on conductor 411 this pulse is reversed in polarity by the impulse coil 413 and applied to the left-hand terminal of diodes 430 and 431 thus causing these diodes to become conducting and maintaining the potential of the output potential 421 at substantially zero or ground potential. As shown in Fig. 4 the normal pulse is delayed by one-eighth of a pulse interval. The inhibiting pulse is applied to the diode 430 without any delay and to the diode 431 with a delay of one-quarter of a pulse interval. Thus the active pulse from conductor 410, which is delayed one-eighth of a pulse interval, is completely suppressed by either or both of the undelayed and delayed inhibiting pulses so that no pulse is obtained on the output conductor 421 even though the active pulse on conductor 410 may be a little longer than the inhibiting pulse obtained from conductor 411.

Figure 5:
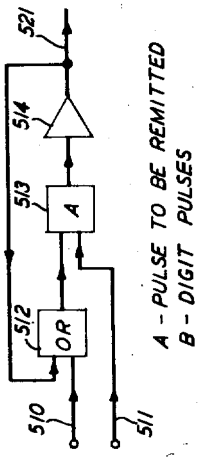
Fig. 5 shows an arrangement for regenerating pulses.

Fig. 5 shows a retiming amplifier wherein the pulses to be retimed are applied to the input conductor 510 and the timing or synchronous pulses are applied to conductor 511. The incoming pulses 510 are transmitted through the "Or" gate 512 and to the "And" gate 513. The gate 513 does not transmit the incoming pulses until the synchronizing pulse is also received. At this time, the positive output is repeated to the output conductor of the gate circuit 513. This pulse is amplified by the amplifier 514 which may be of a suitable type and applied to the output conductor 521. This output potential or pulse is also applied to the one of the input conductors of the "Or" gate 512 and transmitted through this gate through the "And" gate 513. Consequently, a positive output is obtained from the "And" gate 513 even though at this time the input pulse applied to conductor 510 is terminated. Thus the output from gate 513 is maintained so long as the timing or synchronizing is applied to conductor 511. When this pulse terminates then the output of gate 513 is interrupted and the output pulse on conductor 521 from amplifier 514 is also interrupted. Thus the input pulses applied to the conductor 510 are retimed by the circuit arrangement shown in Fig. 5.

Fig. 1A discloses a circuit arrangement for obtaining synchronizing pulses from a source of clock or timing pulses. The clock or timing pulses are generated by a suitable timing pulse generator which generates pulses at a uniform rate which may have a suitable duty cycle, as, for example, fifty percent. It is desired to obtain two types of synchronizing pulses from these clock pulses; (1) normal synchronizing pulses, i. e., one synchronizing pulse from each clock pulse; and (2) a synchronizing pulse for every three clock pulses called a ⅓ synchronizing pulse. To obtain the ⅓ synchronizing pulses, clock pulses on conductor 155 are applied to the normal input conductor of the inhibiting gate 151 and the first pulse so applied is transmitting through the gate circuit 151 to the output lead 156. This pulse is also transmitted through the delay device 154 and applied through the "Or" gate 152 to the inhibiting lead of the inhibiting gate 151. Consequently, the first output pulse applied through the delay device 154 and gate 152 substantially coincides with the second clock pulse on conductor 155. As a result no output pulse is obtained on the output conductor 156 at this time. The pulse delayed one pulse interval by the delay device 154, is also transmitted through a second delay device 152 and again through the "Or" gate circuit 152 to the inhibiting lead of the inhibiting gate 151. As a result, when the third clock pulse is applied to conductor 151 this second delay pulse substantially coincides with it and thus no corresponding pulse is applied to the output conductor 156 in response to the third clock pulse. However, when the fourth clock pulse is applied to conductor 155, the delay pulses have all been transmitted through the corresponding delay devices and dissipated so that no corresponding pulse is applied to the inhibiting lead of the gate 151. Consequently, another pulse is obtained on the output conductor 156. In this manner a pulse is obtained on conductor 156 for every third clock pulse applied to conductor 155. Inasmuch as it is desired to have these ⅓ synchronizing pulse coincide in time with each of the synchronizing pulses applied to the conductor 157, the delay device of one-eighth pulse interval 150 is connected between the input conductor 155 and the output synchronizing conductor 157 to compensate for the one-eighth pulse delay interval in the inhibiting gate or device 151.

Referring now to the operation of the system shown in Fig. 1 and assuming that switch 109 is closed and that power is applied to the system, as a result all of the pulses entered in the delay system via resistor 108 from the negative voltage connected to this resistor are zeros, it is first necessary to enter into this delay system the various identifying pulses and then the word or storage pulses.

In order to enter the identifying digits or pulses, the matching switches 130, 131, 132 and 133 are all set on the zero terminal as shown in Fig. 1. In addition, a switch 149 is operated to the $P_n$ position as shown while the switch 139 is operated to the position opposite to the position shown in the drawing with the switch arm 139 in contact with terminal INT. Switch 134 is likewise closed so positive potential is applied to the input conductor 133 of the "And" gate circuit 128. Switch 135 is also closed.

With the switches 130 through 133 set on their zero contacts or positions, substantially ground or negative potential is applied to the right-hand input circuits of gates 140 through 143. Inasmuch as zeros are stored in the delay line at this time, substantially ground potential is also applied to the taps 190, 191, 192 and 193 of this delay line which in turn applies negative or ground potentials to the left-hand input conductors of the "And" gates 140 through 143. Consequently, positive output pulses are not obtained from any of these gate circuits at this time.

With the switches 130 through 133, inclusive, set on their zero contacts, each positive synchronizing pulse from the synchronizing source or conductor 157 is applied to the right-hand normal input conductors of the inhibiting gate circuits 160 through 163. Inasmuch as all zeros are stored in the delay line at this time, zeros or substantially ground potential is applied at the taps 190 through 193 of the delay line which potential is in turn applied to the left-hand inhibiting input conductors of the inhibiting gate circuits 160 through 162. Consequently, the positive synchronizing pulses from the switches are transmitted through these gate circuits and through the corresponding "Or" gate circuits 170 through 173, inclusive, to the corresponding input conductors of the "And" gate circuit 128. With switch 134 also closed, positive voltage is also applied to the input conductor 133 of the gate circuit 128. As a result, when the ⅓ synchronizing pulse is applied to the input conductor 132 of gate circuit 128 after being delayed one-eighth pulse interval by the delay device 184, a positive pulse is obtained on the output conductor from this gate circuit because positive voltage or pulses are now applied to all of the input conductors of this gate circuit. This positive pulse from the gate circuit 128 is applied to the normal input conductor of the inhibiting gate circuit 129. Inasmuch as a pulse is not applied to the inhibiting lead of the inhibiting gate circuit 129 at this time, the positive pulse is transmitted through this gate circuit and through the switches 139, 149 and through the "Or" gate 194 and entered in the delay line between the delay devices 110 and 111, that is, substantially three pulse intervals behind the output terminal 193. At the termination of the ⅓ synchronizing pulse, the gate 128 is restored to the normal or inactive condition with the result that only a single pulse is entered in the delay system between the delay devices 110 and 111.

The positive output pulse from the gate circuit 128 described above, in addition to being applied to the normal input conductor of the inhibiting gate 129, is also applied to the upper input conductor of gate circuit 138. This pulse is transmitted through this gate circuit and then through the delay device 136 having a delay interval of three pulse intervals. As assumed above, switch 135 is closed so that this pulse will be transmitted through the retiming amplifier 137 and applied to the inhibiting conductor of the inhibiting gate circuit 129. This pulse is delayed three pulse intervals and is timed by the ⅓ synchronizing pulse, delayed one-eighth pulse interval by the delay device 185, so that it will occur exactly three pulse intervals after the first pulse from gate circuit 128. At this time, a positive pulse is obtained from the ⅓ synchronizing generator and applied to the input circuit 128. At this time, however, the first one entered in the delay system appears as the positive pulse on the output conductor 193 with a result that an output is not obtained from either the gate circuit 143 or 163. Consequently, no output pulse is obtained from either the gate circuit 143 or 163 and no output pulse is obtained from the gate circuit 128. However, the pulse applied from the retiming amplifier 137 is also applied to the lower input conductor of the gate circuit 138 and then through the three unit delay device 136. In the above fashion, a single pulse is transmitted around the short delay loop comprising gate 138, delay device 136, switch 135 and retiming amplifier 137 and is thus applied to the inhibiting lead of the inhibiting gate circuit 129 thus preventing any pulses from being transmitted from this gate circuit. In the above manner, the one originally stored in the delay line is transmitted through the delay devices 111, 112, 113, 114, and appears upon conductor 193 three pulse intervals after it was stored, and upon conductor 192 an additional three pulses intervals later. In turn, it appears upon conductor 191, three additional pulse intervals thereafter and upon conductor 190 three more pulse intervals later. During all this entire time, no pulse can be obtained from the output of the gate circuit 128 because the one prevents a positive pulse from being applied to all of the input conductors of gate circuit 128. In addition, the one circulating in the three pulse interval line comprising gate 138, delay device 136, etc., continues to circulate and is applied every third pulse interval to the inhibiting conductor of gate circuit 129.

After the one has been applied to conductor 190, it is then transmitted to the retiming and shaping amplifier 115 and then transmitted around the remainder of the main delay loop. Substantially, three pulse intervals after the one has been applied to the conductor 190, a ⅓ synchronizing pulse is again applied to the gate circuit 128. At this time, zero signal conditions are applied to the terminals 193, 192, 191 and 190 of the delay loop with a result that a positive voltage is applied to all of the input conductors of gate circuit 128. Consequently, another output positive pulse is obtained on the output conductor of this gate circuit and applied to the normal input conductor of the inhibiting gate 129. However, at this time, a pulse is also applied to the inhibiting input conductor of the gate circuit 129 so that no positive pulse can be obtained on the output of this gate circuit.

In this fashion, the circuits continue to operate with the one originally entered circulating around the delay loop described above and one circulating around the minor three pulse interval delay loop in the fashion described above. However, the circuits do not in otherwise respond.

Next switch 134 is opened and then switch 135 opened. Thereafter, it is impossible to obtain any pulses from the gate circuit 128 because substantially ground or a negative potential is now applied to the input conductor 133 which prevents any positive output from being obtained from gate circuit 128. Next the switches 130 through 133 are actuated in accordance with the next number or identifying digit desired to be entered in the delay line. Assuming that the digits desired to be entered are as shown in the last column of Table A, switch 133 will be operated to represent a one, that is, the opposite position to that shown in the drawing, and the remaining switches 132, 131 and 130 left in the position shown in the drawing. Next switch 135 is closed and then switch 134 is closed. Then when the one previously entered in the main storage delay loop appears on the output conductor or tap 193, a positive voltage is applied to the left-hand input conductor of gate circuit 143 and a positive synchronizing pulse is substantially simultaneously applied to the right-hand conductor of this gate circuit from the switch arm of switch 133 which is now resting on the No. 1 terminal of this switch. As a result, a positive voltage is now obtained from the output of gate circuit 143 and applied through the delay device 183 and the "Or" gate 173 to the gate circuit 128. Inasmuch as voltages representing zeros are applied to the delay loop terminals 192, 191 and 190, at this time, positive output voltages are also obtained on the output conductors of the inhibiting gate circuits 162, 161 and 160 which voltages are transmitted through the corresponding "Or" gate circuits 172, 171 and 170 to the gate circuit 128. At this time, a positive voltage or pulse is also obtained from the ⅓ synchronizing conductor or circuit described above, with the result that a positive voltage or pulse is again obtained from the gate circuit 128. This voltage is transmitted through the inhibiting gate circuit 129 and entered in the delay loop through the "Or" gate circuit just three pulse intervals behind the first one entered in this delay loop. It is to be noted that the delay interval of the delay device 111 is three units less than one-fourth of a unit. However, the pulse is delayed an eighth of a pulse interval or unit in passing through one or more of the delay devices 180 through 183 or through one or more of the inhibiting devices 160 through 163 and also one-eighth of a pulse interval in passing through the inhibiting device 129 in the manner desired above. Consequently, a second pulse is entered in the delay loop substantially three pulse intervals after the first pulse is entered in the loop. The pulse from the gate circuit 128 is also entered in the minor three interval delay loop 164 and circulates around this loop and prevents the transmission of any further pulses from the gate circuit 129 until the switches 134 and then 135 are again opened and the matching switches 133, 132, 131 and 130 again actuated as desired and then the switches 134 and 135 again closed. The ⅓ synchronizing pulse is delayed an eighth of a pulse interval by delay devices 184 and 185 so that it coincides with the input pulses and thus with the output pulse of gate 128.

In entering the fourth one in the fourth word or storage space in the delay line, the switches 130, 131, 132 and 133 will be set in their positions 0111, after which the fourth one will be entered in the manner described above. The next identifying digit in the sequence as shown in Table A, has a zero. Inasmuch as zeros are already entered in the delay line, it is not necessary to actuate the circuits to enter this zero. Consequently, the next one will be entered in the sixth storage slot or space. In order to enter a one in this position, the switches 130, 131, 132 and 133 will be set to represent 1110, after which the other switches are set in the above-described manner and the sixth one entered. The various switches 130 through 133 are then actuated in appropriate manners to cause the various other ones in the last column of column 5 of the table to be entered in the respective ones of the word or storage spaces.

After all of the identifying digits have been thus entered in the delay line, each three units apart, the switches will then be atcuated so that the two digit spaces between each of the identifying digits comprising the words or storage spaces or storage items may have recorded in them the information desired to be stored. At this time, switch 149 will be actuated so that the switch arm will engage the lower or "W" contact. The matching switches 130 through 133 will then be set in accordance with the identifying number employed to identify the word or storage information or item desired to be stored as said identified stored item. Switches 122 and 123 will then be actuated to engage their one or zero contacts in accordance with the character of the two digits of the word to be entered. Thereafter, switches 134 and 135 are again actuated to their on or closed positions. Then when the identifying digits corresponding to the setting of the switches 130 through 133 substantially simultaneously appear on the conductors or output terminals 190 through 193 of the storage delay loop a positive output pulse is obtained from the gate circuit 128 which is transmitted through the inhibiting circuit 129 in the manner described above. This pulse is then transmitted through switch 139 and switch 149 to the inhibiting gate circuits 117 and 120, thus removing any previously stored pulses in these positions in the delay line. In addition, a positive pulse is transmitted through the delay device 126 to the gate circuits 124 and 125. If the corresponding switches 122 and 123 are actuated to their No. 1 position a positive pulse is transmitted through these gate circuits and the corresponding gate circuits 121 and 118 to the delay line. If either or both of the switches 122 and 123 are set in their zero position then no such positive pulse will be transmitted to the delay line so that zeros and not ones will be stored in the delay line. It is thus apparent that both of the word digits are substantially simultaneously entered in the delay line and they are entered in the delay line or loop in the two digit spaces immediately preceding or ahead of the identifying digits. In this manner, the information to be stored with each of the identifying digits is entered in the delay line.

After all of the information to be entered in the delay line has thus been entered, a switch 139 is actuated to the position shown in the drawing, switches 134 and 135 having been previously opened. When it is desired to read out any of the information stored in the delay line, the matching switches 130 through 133 are then set in accordance with the identifying number of the desired information and switches 134 and 135 again closed. As a result, when the corresponding identifying digits substantially simultaneously appear at the output terminals 190, 191, 192 and 193 from the delay loop, a positive pulse is obtained from the gate circuit 128 which pulse is transmitted through the inhibiting circuit 129 and switch 139 to the delay device 144 and through the output gate circuit 148 to the output conductor 100. This output pulse serves as a start or control pulse indicating that the desired information will follow. The output pulse from the inhibiting gate 129 is also transmitted through the delay device 144 and one interval later appears on the output circuit of this device and is transmitted to the second delay device 145 and also through gate circuit 146 to gate circuit 147. At this time, gate circuit 147 has applied to its left-hand input conductor the output from the delay device 127. Delay device 127 has a delay interval of three and one-quarter pulse intervals. Consequently, the output pulse from inhibitor 129 substantially coincides with the previous identifying digit in the previous word. This digit is not transmitted through gate device 147 because no positive pulse is applied to its upper input conductor at that time. However, the next succeeding storage pulse is transmitted through this gate because a positive pulse is applied to its upper input terminal after having been transmitted through the delay device 144 and gate circuit 146. Likewise, the next pulse is also transmitted through the gate circuit 147 because a second positive pulse is applied to its upper terminal from the second delay device 145 and the gate circuit 146. These pulses are both transmitted through the output circuit 148 to the output conductor 100. Thus when a match is obtained between the setting and the address switches 130 through 133 designating a predetermined one of the storage items, the storage item immediately preceding the first of the identifying digits is transmitted to the output conductor immediately after a start pulse transmitted over this conductor. In this manner, any stored information may be obtained from output conductor 100 under control of the matching keys 130 through 133 without in any way mutilating or destroying any of the stored information.

The various pulses stored in the delay loop continue to circulate in a normal fashion and are regenerated, reshaped and retimed on each passage around the loop by a reshaping and retiming amplifier 115, and are thus available at all times. When it is desired to remove any of the pulses or stored items they are removed in the manner described above for entering the zeros or other desired pulses in their places. In the above-described arrangement where switch 135 closed, the output information is obtained on conductor 100 only once for each closure of the switches 134 and 135. If switch 135 is left open instead of being closed, then the output word or information will be obtained on conductor 100 repeatedly each time the word and accompanying identifying digits pass the above-described output terminals of the delay loop until switch 134 is opened. Then the matching switches may be set in accordance with the digits of other identifying numbers and the correspondingly identified information or signals obtained on conductor 100.

Thus, in the exemplary embodiment described above, each of sixteen storage items may be stored and recovered and uniquely identified by the addition of only sixteen identification digits, one for each item. In the embodiment described herein, such identifying items require that the length of the delay line be increased by a third. If each of the stored words had had more digits in them, then the percentage increase in the line is progressively reduced as the number of digits in the word decreases. However, if, as in the prior art, four additional identifying digits had been added to each word and the line had had to be increased not by one-third but three times. In other words, it would have to have 96 digit spaces in the line because 64 digit spaces would have been required to identify the sixteen lines.

Of course, the invention is not limited to storage devices for storing sixteen words or sixteen storage items but may be employed to store any number of words or items and it is not limited to storing words of two digits or two characters but may be employed to store and identify any desired number of words or storage spaces of any desired length or magnitude.

Figs. 6 and 7 with Fig. 6 positioned to the left of Fig. 7 show another embodiment of a serial delay line storage system embodying the present invention. In the embodiment shown in Figs. 6 and 7 a shift register is employed to respond to the added address pulses and also to increase the delay or storage capacity of the delay loop.

The delay loop, as shown in Figs. 6 and 7, comprise the main delay line 633 which may comprise any of the types of delay lines or combinations thereof referred to with respect to delay line 110. The output of the delay line 633 is transmitted through a retiming amplifier comprising the gate circuits 720, 721 and amplifier 722. The retimed pulses from amplifier 722 then are transmitted through the gate circuit 723, the delay device 708 and then through a 12-stage shift register 701. The shift register 701 comprises gate circuits, delay devices and flip-flop circuits as shown. Gate and delay circuits of the types described above may be employed in the shift register. Details of an exemplary flip-flop circuit suitable for use in the shift register 701 are shown on page 577 of "The Transistor" prepared by Bell Telephone Laboratories, Incorporated and copyrighted in 1951.

Both the "zero" and "one" leads are carried through the shift register, the output of the delay device 708 being connected to the "one" lead and synchronizing pulses through the delay device 707 being connected to the "zero" lead of the shift register. The output leads of the shift register then extend through the respective gate circuits 748, 747, amplifiers 736 and 735 and then through the delay devices 644, 645, double stability or flip-flop circuit 622, the gate circuits 616 and 617, delay devices 642 and 643, gate circuits 629 and 630, double stability circuit 621, gate circuits 635 and 636, delay devices 640 and 641, gate circuits 627 and 628 and the double stability or flip-flop circuit 620. The output on the "zero" lead of the flip-flop circuit 620 is discarded since this lead is not connected while the output from the "one" lead 620 is transmitted through the gate circuit 631 and amplifier 632 to the input of the delay line 633.

In the arrangement shown in Figs. 6 and 7, the active condition of any conductor or lead or output is a positive pulse while the inactive condition is a lower voltage usually near ground potential or negative. Of course, other suitable voltages may be employed to represent the active and inactive conditions when desired. The above conditions have been chosen so as to aid in the description and understanding of the invention.

The twelve-stage shift register comprises twelve double stability circuits frequently called flip-flop circuits. These double stability circuits, together with the circuits 620, 621 and 622 are arranged so that they have two conditions of equilibrium and when any one of the circuits are set in either one of the conditions of equilibrium it will remain in that condition until set in the opposite condition by applied signals or voltage pulses.

Each of these double stability circuits has two input leads designated "zero" and "one," respectively, and two output leads likewise designated "zero" and "one." When a positive voltage is applied to the "zero" input lead, the flip-flop circuit is actuated to the stability condition in which positive voltage is applied by the circuit to the "zero" output lead. If the circuit were already in that condition, it will remain in that condition. Likewise, when a positive voltage is applied to the "one" input lead, the circuit is actuated so as to apply a positive voltage to the "one" output lead. If the circuit had previously been actuated to said condition, then the circuit will remain in that condition.

The gate circuits, amplifier circuits, delay lines, etc. are represented in Figs. 6 and 7 by the same symbols as are employed in Fig. 1. These circuits are shown in greater detail in Figs. 2, 2A, 3, 3A, 4, 4A and 5 as described above.

Normally, when power is first applied to the system, no information will be stored in the delay loop so that storage loop will have recorded in it all zeros. Consequently, in order to put the system into operation, it is first necessary to enter the address or identifying pulses in accordance with this invention in the storage system and then the storage information.

As in the previous embodiment, it is assumed that it is desired to storage sixteen two-letter words or sixteen two-digit numerals in the delay loop. It is also desired to add a single identifying or address digit or letter to each of the words so that the delay loop has a delay interval of 48 intervals.

In order to first enter the identifying or address digits or numerals, it is necessary to properly actuate the various input switches and control devices. One manner of so actuating these devices will now be described. Switch 634 is closed so each positive pulse thereafter applied to the left-hand input of gate 631 is transmitted from this gate circuit upon the application of each of the synchronizing pulses to the synchronizing input. However, at this time no "ones" are stored in the delay loop. In addition, the address or identifying switches 713, 714, 715 and 716 of the control circuits 709, 710, 711 and 712 are all actuated to their "zero" position as shown in the drawing. Switch 719 is also closed.

When power is applied to the system the various flip-flop circuits are energized. Then positive synchronizing pulses are applied to the delay device 707. These pulses are then successively applied to the "zero" input conductor of these flip-flops which causes them all to be set in their zero state as well as the flip-flop circuits 622, 621 and 620. The above-described operation of the circuit in causing the various flip-flops to be all set in zero takes place before the start key 634 is closed, so that any other setting of these circuits does not interfere with the proper operation of the system. With all of the flip-flops of the shift register set at zero, positive potential is applied to the "zero" output lead and all of these circuits. Consequently, positive potential is applied to both the input conductors of the gate circuits 770, 771, 772 and 773 so a positive potential is obtained from the output of the circuits 731, 732, 733 and 734 and applied to the gate circuit 760. Gate circuit 760 is an "and" circuit and requires a positive potential to be applied to all of its input conductors before a positive pulse is applied to its output conductor. If the flip-flop circuit 728 initially assumes its "zero" state, then positive voltage is applied to its output "zero" lead and thus to one of the conductors of gate 760. If the flip-flop circuit 728 does not initially assume its zero state reset switch 717 must be operated which applies a positive pulse through condenser 730 and diode 729 to the zero input conductor of the flip-flop circuit 728 and as a result, a positive voltage is applied from "zero" output of this flip-flop circuit to the "and" circuit 760. Condenser 730 is connected in a network of resistors so that a positive voltage of only short duration is applied to the "zero" input conductor of the flip-flop circuit 728 during the charging time of this condenser. The condenser then becomes charged so that it is necessary to open a switch 717 and reclose it if it is desired to apply another positive voltage to the "zero" input conductor of the flip-flop circuit 728.

In addition, the switch 776 must be closed and then the next ⅓ synchronizing pulse applied to the gate circuit 760 will cause a positive pulse to be transmitted to the output conductor of the gate circuit 760. This pulse is transmitted through the amplifier 737 and then through the closed switch 719 as well as to the gate circuits 706, 759 and the delay circuit 758. Under the initial assumed condition, the switches 704 and 718 are open so this pulse is not transmitted through the gate circuit 706 or 759. The pulse, however, is transmitted through the delay device 758 to the "one" input lead of the flip-flop circuit 728. As a result, positive potential is removed from the "zero" output conductor of this circuit. Consequently, only one positive pulse may be obtained from the output conductor of the gate circuit 760 at this time.

In order to enter the identifying digits in the proper positions in the delay loop switch 719 has been closed so that the above-described pulse from the gate circuits 760 is applied to the gate circuit 723 and thus entered in the storage system. This pulse is then transmitted through delay device 708 and entered in the first flip-flop circuit 705. As a result, positive voltage is removed from the "zero" output conductor of the flip-flop circuit and applied to the "one" output conductor of a flip-flop circuit 705.

Upon the application of the next synchronizing pulse to the gate circuit between the first and second flip-flop circuits corresponding to the gate circuits 740 and 741, the second flip-flop circuit will be set in its one condition while a quarter of a pulse interval later the first flip-flop circuit is set in its zero state. Upon the application of the next synchronizing pulse to the gate circuit 741, the third flip-flop circuit 724 is set in its "one" state. In the above-described manner, the one entered in the delay loop is advanced through the flip-flop circuits, one stage for each interval, and around the delay loop described above. So long as power is applied to the system this "one" continues then to circulate. Next the various switches are again manipulated to cause the second one to be entered. In this case, switch 713 is actuated to its "one" position while the remaining address switches remain in their "zero" positions. Switches 776 and 719 are maintained closed and switch 717 opened and then reclosed. Upon the opening of switch 717 the condenser 730 discharges and upon the reclosure of switch 717, during the charging time of condenser 730, a positive pulse is again applied to the "zero" input lead of the flip-flop circuit 728 which in turn applies a positive pulse to the corresponding input conductor of gate circuit 760.

As a result, when the one first entered in the delay loop causes the third flip-flop circuit 724 to be set in its one position after the switch 717 has been opened and reclosed, it causes a positive output pulse to be obtained from gate circuit 760. At this time the "one" output of the third flip-flop 724 will have a positive voltage applied to it and with the switch 713 actuated to its one position both input conductors of gate 780 have positive voltage applied to them so that a positive voltage is obtained on the output conductor of this gate circuit and transmitted through the gate circuit 731. Since the remaining address switches or keys 714, 715, 716, etc. are set in their "zero" position and positive voltage is obtained on the "zero" output conductors of the other flip-flop circuits of the shift register, a positive output voltage is also obtained from the gate circuits 732, 733 and 734 and transmitted to the gate circuit 760.

The positive output pulse from gate circuit 760 is again transmitted through amplifier 737 and delay device 758 to the "one" input lead of the flip-flop circuit 728 actuating this circuit to its "one" position and removing positive voltage from corresponding input conductor of the gate circuit 760. The positive pulse from the gate circuit 760 is also transmitted through closed switch 719 and again entered in the delay loop. At this time, the one first entered in the delay loop is stored in the third flip-flop 724 of the shift register. Consequently, the second one entered in the delay loop is entered three pulse intervals behind the first one entered in the delay loop. Thereafter, the two ones so entered in the delay loop continue to circulate around the delay loop.

In the above-described manner, the "ones" in accordance with Table A are entered in the appropriate time or storage slots in the delay system. The address switches 713 through 716 are positioned in a manner similar to the manner that the switches 130 through 133 are positioned to enter the identifying signals in the delay loop represented in Fig. 1. As pointed out above, it is unnecessary to enter the "zeros" so that the switches will be positioned accordingly. After all of the "ones" in accordance with the last column in column 5 of Table A have been entered in the delay line in the appropriate positions, switch 719 is opened and switch 718 closed. Thereafter, the switches 713 through 716 are positioned in accordance with the address of each of the storage words. When these switches are positioned in accordance with one address and switches 610 and 611 are positioned in accordance with the digits or character of the corresponding storage word or information, the reset key 717 is momentarily opened and reclosed. Then when the sequence of identifying digits in the third, sixth, ninth and twelfth stages of the shift register correspond with the setting of the corresponding keys 713, 714, 715, 716, etc. a pulse is obtained on the output conductor of gate circuit 760 because a ⅓ synchronizing pulse will be applied to one of the input conductors of this gate circuit at this time and a positive pulse is also applied to all of the other input conductors of this gate circuit at this time in the manner described above.

The output pulse from the gate circuit 760 is transmitted through amplifier 737 and the delay device 758 and sets the flip-flop 728 in its "one" state and thus prevents any further pulses from the gate circuit 760.

The positive pulse from gate circuit 760 and amplifier 737 is also transmitted through the gate circuit 759 at this time since switch 718 is closed thus applying the positive voltage to both of the input conductors to gate 759. The pulse from the gate circuit 759 is transmitted through the delay device 650. The delay device 650 is a half pulse interval. Consequently, the pulse is not transmitted through this gate until after the synchronizing pulses applied to the gate circuits 616, 617, 636 and 635 have been transmitted through the corresponding delay devices 642, 643, 640 and 641, respectively, and conditioned the flip-flops 621 and 620. At this time, since "zeros" were previously stored in the delay lines at these positions, these flip-flop circuits will be set in their "zero" state. A one-quarter of a pulse interval later, that is a half pulse interval after a synchronizing pulse has been applied to the gate circuits 616, 617, 636 and 635, the delayed pulse from delay device 650 applied to the gate circuits 612, 613, 614 and 615. As a result, a pulse is transmitted from either the gate circuit 612 or 613 depending upon the position of switch 610 to condition the flip-flop circuit 620. Likewise, a pulse is transmitted through the gate circuit 614 or 615 and the gate circuits 630 and 629 to position the flip-flop circuit 621.

It should be noted that at the same time, the ⅓ synchronizing pulse is applied to the gate circuit 760 and a pulse is transmitted through the amplifier 737 and delay devices 650 and 758 in the manner described above, synchronizing pulses are also substantially simultaneously applied to all of the gate circuits 740 through 747, 616, 617, 636 and 635. As a result, at the end of a delay interval of approximately one-quarter of a pulse interval, the identifying character which was stored in the twelfth flip-flop has been advanced to the flip-flop 622. The immediately preceding two pulse characters or spaces have likewise been advanced to the flip-flops 621 and 620. Thus, these flip-flops are set in a condition to represent pulses in the immediately two preceding pulse spaces in the delay line. That is, the two pulse spaces preceding the identifying pulses which was in the twelfth stage of the flip-flop circuit and is now advanced to the flip-flop circuit 622.

Simultaneously, with the advancing of the pulses to the flip-flop circuits 622, 621 and 620 as described above, the pulses within the shift register are also advanced one stage.

Thus, when the pulse is finally transmitted through the delay device 650 and in turn causes the flip-flops 620 and 621 to be set in accordance with the position of the switches 610 and 611, the word identified by the immediately following pulse and the identifying pulses of the following three words is entered in the storage system. In the above-described fashion, the signals representing the other storage information are all entered in the time slots or spaces in the delay line, each word being entered immediately preceding the first of the identifying pulses employed to identify that word. The remainder of the identifying pulses for identifying that particular word is being stored in the pulse identifying position of the succeeding three words.

After the switches 713 through 716 have been set in accordance with each of the addresses or identifying combinations for which it is desired to enter words in the storage line, switch 718 is opened.

At this time, the storage system is in condition to selectively transmit on the output conductor 780 any selected one of the stored words preceded by a "one" pulse. The first pulse transmitted on the output conductor is a "one" and is employed as a synchronizing or start pulse to indicate that word pulses will follow. When it is desired to so deliver an output on conductor 790, the read switch 704 is closed. Then the address switches 713 through 716 are set in accordance with the address of the desired word and then switch 717 is again opened and reclosed. If the switch had previously been opened, it will be reclosed. Switch 776 is also reclosed if it had been opened.

Thereafter, when the identifying digits in the third, sixth, ninth and twelfth stages of the shift register have the same character as the setting of the corresponding switches 713, 714, 715, 716 etc. a positive pulse is obtained on output conductor of the gate circuit 760 which pulse again sets a flip-flop 728 in its "one" state so that no further pulses will be received from the gate circuit 760. In addition, the pulse from the output conductor of the gate circuit 760 after being amplified by amplifier 737 is also transmitted through gate circuit 706 since the key 704 is now closed. From the gate circuit 706 a pulse is transmitted through the half pulse interval delay device 792 to the gate circuit 784.

A positive pulse from the gate circuit 706 is also applied to one of the input circuits of gate circuits 625 and 626. Consequently, if the flip-flop 621 is set in its "one" state, a positive pulse is obtained from gate circuit 626 and transmitted through the delay device 648 and gate circuit 637 and causes the flip-flop 624 to be set in its "one" state. Likewise, if the flip-flop circuit 622 is set in its "one" state, a positive pulse is obtained from gate circuit 625 at this time and transmitted through the delay device 649 to the flip-flop 623 where it causes this flip-flop to be set in its "one" state.

The flip-flop 623, 624 and 787 comprise a three-stage shift register similar to the shift register comprising flip-flops 705, 724, 725, 726, 727, etc. Normally when power is applied to the system synchronizing pulses are transmitted through the delay device 647 and cause the flip-flop circuit 623 to be set in a "zero" state if it originally assumed its "one" state. The next synchronizing pulse transmitted through the gate circuit 618 causes the flip-flop circuit 624 to be set in a "zero" state. The next synchronizing pulse transmitted through gate 748 cause the flip-flop circuit 787 to be set in its "zero" state. Thus, at this time, after three synchronizing pulses, after power has been applied to the system, the three flip-flop circuits 623, 624 and 787 are all set in their "zero" condition. When a pulse is transmitted through the gate circuit 706 in the manner described above, when it is desired to read a particular stored word, this pulse will be transmitted to the gate circuits 625 and 626 and also through the delay device 792. In addition, a pulse is transmitted through the delay devices 649 and 648 if the flip-flops 622 and 621 are in their one condition at this time. In other words, the flip-flop 787 is always set in its "one" condition at this time and the flip-flops 623 and 624 are set in the same state as the flip-flops 622 and 621, respectively. In response to the next synchronizing pulse, a "one" is transmitted through the gate circuit 791 to the output 790. In addition, a quarter of a pulse interval later the flip-flop circuit 787 will be set in the state that flip-flop 624 was in when this synchronizing pulse is applied to the gate circuits 747, 748 as well as to the gate circuit 791.

In a similar manner, the flip-flop 624 is set in the state under control of flip-flop 623. In response to the next synchronizing pulse, a "one" will be applied to the output conductor 790 if flip-flop 787 is now in its "one" state. If flip-flop 787 is in its zero state, no such pulse is transmitted on the output conductor 790. In a similar manner, during the next pulse interval, the next synchronizing pulse is applied to the gate circuit 790, and a third output "one" pulse is transmitted over the output conductor 790 if the flip-flop 787 is set in its "one" state at that time.

Thus, in response to the three synchronizing pulses following the ⅓ synchronizing pulse applied to gate 760 which caused an output from this gate circuit to be transmitted through the gate 706, first a "one" pulse is transmitted over the output conductor 790. Next, during the second pulse interval, a "one" pulse is transmitted over the output conductor 790 if a "one" had been stored in the flip-flop 621. Likewise, during the third pulse interval, a "one" will be transmitted over the output conductor 790 if a "one" had been stored in the flip-flop 622. If "zeros" were stored in either of the flip-flops 621 and 622, then output signals representing "zeros" instead of "ones" are obtained from the gate circuit 760. Thus, a "one" followed by two signals or pulses representing the digits stored in the delay line immediately preceding the address digits controlling the gate circuit 760 are obtained on the output conductor 790.

These signals or pulses also circulate in the delay line in the manner described above, so that they will be available for transmission over the output conductor 790 when it is again desired to obtain them on the output conductor 790. Of course, if it is desired to repeatedly obtain this word on the output conductor 790, then the "zero" output flip-flop 728 may be maintained at a positive voltage in any suitable manner.

While two specific exemplary embodiments of the invention have been described above the invention is not limited to said embodiments. Instead, the invention may be embodied in other specific forms without departing from the spirit or essential characteristics thereof. The exemplary embodiments presented are therefore to be considered illustrative rather than restrictive.

What is claimed is:

1. In a serial storage system, a multiword space serial delay storage element, means responsive to signals representing stored information received from the end of said storage element for regenerating said received signals and applying said regenerated signals to the input of said multiword storage element, means for adding a signal representing a single identifying digit to each of the word spaces in said storage element, and means controlled by a plurality of said signals representing identifying digits for controlling the storage of signals representing information in the word space of said device defined by said plurality of identifying digits.

2. In a serial storage system, delay means for storing a plurality of signals representing a plurality of multi-character words having an input and an output, means responsive to signals representing stored information received from said output of said delay means for regenerating said received signals and applying said regenerated signals to said input of said delay means, means for adding a single identifying signal to each of said words, a plurality of taps connected to said delay means spaced a word interval apart, and means responsive to said added identifying signals substantially simultaneously received from said taps for controlling the storage of signals representing said words in said delay means at locations defined by said plurality of identifying digits.

3. In a serial storage system, delay means for storing a plurality of signals representing a plurality of multi-character words having an input and an output, means responsive to signals representing stored information received from said output of said delay means for regenerating said received signals and applying said regenerated signals to said input of said delay means, means for adding a single identifying signal to each of said words, a plurality of taps connected to said delay line spaced a word interval apart, and means responsive to said additional address signals substantially simultaneously received from said taps for reading out of said delay means signals representing the word defined by said plurality of identifying digits.

4. In a serial storage system, in combination, delay means for storing a plurality of signals, timing means for dividing the said signals into groups representing words, means for recirculating signals through said delay means, means for including a single address signal in each of said groups, apparatus for substantially simultaneously determining the character of a predetermined number of said address signals in said groups, and means responsive to the character of predetermined groups of said address signals for controlling the entering of signals in predetermined locations in said delay means.

5. In a serial storage system, in combination, delay means for storing a plurality of signals, timing means for dividing the said signals into groups representing words, means for recirculating signals through said delay means, means for including a single address signal in each of said groups, apparatus for substantially simultaneously determining the character of a predetermined number of said address signals in said groups, and means responsive to the character of said predetermined group of said address signals for selectively reading out the word defined by said address group of signals as said word is recirculated in said delay means.

6. In a serial storage system, delay means comprising the main delay section, a plurality of short delay sections connected in tandem, recirculating means for applying signals received from said delay means to the input of said delay means, and means controlled by the signals substantially simultaneously received at the connections between said delay sections for controlling the signals recirculated.

7. In a serial storage system, main delay means for storing pulse signals for a plurality of pulse intervals, timing means for dividing said pulse intervals into groups representing word spaces and a single address pulse interval individual to each of said word spaces, a plurality of pulse delay means for delaying pulses for an interval equal to the number of pulse intervals in said word intervals plus the single address interval individual thereto, means for connecting all said delay devices in a loop for recirculating pulses around said loop, and means controlled by a plurality of the signals in said address intervals substantially simultaneously present at the connections between the delay means for selectively controlling the storing of signals in a selective one of said word intervals identified by said plurality of address signals.

8. In a serial storage system, delay means for storing pulse signals for a plurality of pulse intervals, timing means for dividing said pulse intervals into groups representing word spaces and a single address pulse interval individual to each of said word spaces, a plurality of pulse delay means for delaying pulses for an interval equal to the number of pulse intervals plus address interval in said word intervals, means for connecting all said delay devices in a loop for recirculating pulses within said loop, and means for determining the characters of the signals stored in the one of said word intervals identified by said plurality of address signals.

9. In a serial storage system, in combination, delay means for storing signals, a plurality of signal intervals, means for entering a single address signal having predetermined characteristics at regularly spaced intervals in said delay means, a shift register, means for supplying said address signals to said shift register, and apparatus controlled by said shift register for determining the character of signals stored in said delay means between said address signals.

10. In a serial storage system, a delay means for storing signals in a plurality of signal intervals, an input circuit and an output circuit for said delay means, a shift register connected between said input and output of said delay means forming a delay loop, a signal regeneration means connected in said signal delay loop, and means controlled by a plurality of signals each separated from the other in said delay means by at least one pulse interval substantially simultaneously present at a plurality of stages of said shift register for determining the character of other signals in said delay loop.

No references cited.